US008379915B2

(12) United States Patent
Sharon et al.

(10) Patent No.: US 8,379,915 B2
(45) Date of Patent: Feb. 19, 2013

(54) METHOD OF PERFORMING MOTION-BASED OBJECT EXTRACTION AND TRACKING IN VIDEO

(75) Inventors: Eitan Sharon, San Mateo, CA (US); Achi Brandt, San Mateo, CA (US)

(73) Assignee: Videosurf, Inc., San Mateo, CA (US)

( * ) Notice: Subject to any disclaimer, the term of this patent is extended or adjusted under 35 U.S.C. 154(b) by 912 days.

(21) Appl. No.: 11/687,261

(22) Filed: Mar. 16, 2007

(65) Prior Publication Data

US 2008/0118107 A1 May 22, 2008

Related U.S. Application Data

(60) Provisional application No. 60/869,271, filed on Dec. 8, 2006, provisional application No. 60/869,279, filed on Dec. 8, 2006, provisional application No. 60/866,552, filed on Nov. 20, 2006.

(51) Int. Cl.
*G06K 9/00* (2006.01)
*G06K 9/34* (2006.01)
*G06K 9/62* (2006.01)
*G06K 9/46* (2006.01)
*G06F 17/30* (2006.01)

(52) U.S. Cl. ........ 382/103; 382/107; 382/173; 382/224; 382/236; 707/706; 707/769; 707/729

(58) Field of Classification Search .................. None
See application file for complete search history.

(56) References Cited

U.S. PATENT DOCUMENTS

| | | |
|---|---|---|
| 4,639,773 A | 1/1987 | Hurst |
| 5,392,223 A | 2/1995 | Caci |
| 5,410,643 A | 4/1995 | Yomdin et al. |
| 5,473,384 A | 12/1995 | Jayant et al. |
| 5,638,135 A | 6/1997 | Mukai |
| 5,838,838 A | 11/1998 | Overton |
| 5,886,745 A | 3/1999 | Muraji et al. |
| 5,923,775 A | 7/1999 | Snyder et al. |
| 6,229,929 B1 | 5/2001 | Lynch et al. |
| 6,370,543 B2 | 4/2002 | Hoffert et al. |
| 6,396,948 B1 | 5/2002 | Lynch et al. |
| 6,442,203 B1 | 8/2002 | Demos |
| 6,449,608 B1 | 9/2002 | Morita et al. |
| 6,462,768 B1 | 10/2002 | Oakley |
| 6,611,296 B1 | 8/2003 | Nieuwenhuizen et al. |

(Continued)

FOREIGN PATENT DOCUMENTS

| | | |
|---|---|---|
| CN | 1199449 C | 4/2005 |
| EP | 1152621 | 11/2001 |

(Continued)

OTHER PUBLICATIONS

International Search Report and Written Opinion issued for PCT/US2007/024199; Dated: May 22, 2008; 9 Pages.

(Continued)

*Primary Examiner* — Tom Y Lu
*Assistant Examiner* — Thomas Conway
(74) *Attorney, Agent, or Firm* — Vierra Magen Marcus & DeNiro LLP

(57) ABSTRACT

A method of extracting objects from a video includes the identification of regions to be tracked, tracking the regions across several frames, calculating motions of the regions, and identifying new regions to be tracked. Regions of a selected frame of the video that are appropriate for tracking are selected. Tracking of the identified regions is then performed across frames subsequent to the selected frame of the video. Motions of the identified regions are calculated, and new regions for tracking are identified.

20 Claims, 2 Drawing Sheets

U.S. PATENT DOCUMENTS

| | | | |
|---|---|---|---|
| 6,643,387 B1* | 11/2003 | Sethuraman et al. | 382/107 |
| 6,714,929 B1 | 3/2004 | Micaelian et al. | |
| 6,718,365 B1 | 4/2004 | Dutta | |
| 6,766,037 B1 | 7/2004 | Le et al. | |
| 6,774,917 B1 | 8/2004 | Foote et al. | |
| 6,792,575 B1 | 9/2004 | Samaniego et al. | |
| 6,850,651 B2 | 2/2005 | Zaklika et al. | |
| 6,891,891 B2 | 5/2005 | Pau et al. | |
| 7,031,555 B2 | 4/2006 | Troyanker | |
| 7,042,527 B2 | 5/2006 | Imai | |
| 7,042,639 B1 | 5/2006 | McDowell | |
| 7,043,078 B2 | 5/2006 | Guleryuz | |
| 7,080,392 B1 | 7/2006 | Geshwind | |
| 7,136,524 B1* | 11/2006 | Goh et al. | 382/167 |
| 7,146,361 B2 | 12/2006 | Broder et al. | |
| 7,246,314 B2 | 7/2007 | Foote et al. | |
| 7,421,455 B2 | 9/2008 | Hua et al. | |
| 7,555,718 B2 | 6/2009 | Girgensohn et al. | |
| 7,920,748 B2 | 4/2011 | Sharon et al. | |
| 8,059,915 B2 | 11/2011 | Sharon et al. | |
| 2001/0049826 A1 | 12/2001 | Wilf | |
| 2002/0003900 A1 | 1/2002 | Kondo | |
| 2002/0114394 A1 | 8/2002 | Ma | |
| 2003/0088554 A1 | 5/2003 | Ryan et al. | |
| 2003/0097301 A1 | 5/2003 | Kageyama et al. | |
| 2003/0120652 A1 | 6/2003 | Tifft | |
| 2004/0013305 A1 | 1/2004 | Brandt et al. | |
| 2005/0179814 A1 | 8/2005 | Pau et al. | |
| 2005/0216851 A1 | 9/2005 | Hull et al. | |
| 2005/0275626 A1 | 12/2005 | Mueller et al. | |
| 2006/0122997 A1 | 6/2006 | Lin | |
| 2006/0291567 A1 | 12/2006 | Filippini et al. | |
| 2007/0078832 A1 | 4/2007 | Ott, IV et al. | |
| 2007/0157239 A1 | 7/2007 | Wang et al. | |
| 2007/0185858 A1 | 8/2007 | Lu et al. | |
| 2008/0021710 A1 | 1/2008 | Ho | |
| 2008/0080743 A1 | 4/2008 | Schneiderman et al. | |
| 2008/0086688 A1 | 4/2008 | Chandratillake et al. | |
| 2008/0118108 A1* | 5/2008 | Sharon et al. | 382/103 |
| 2008/0120290 A1 | 5/2008 | Delgo et al. | |
| 2008/0120291 A1 | 5/2008 | Delgo et al. | |
| 2008/0120328 A1 | 5/2008 | Delgo et al. | |
| 2008/0154889 A1 | 6/2008 | Pfeiffer | |
| 2008/0159622 A1 | 7/2008 | Agnihotri et al. | |
| 2008/0159630 A1 | 7/2008 | Sharon et al. | |
| 2008/0193017 A1 | 8/2008 | Wilson et al. | |
| 2008/0292187 A1 | 11/2008 | Eitan et al. | |
| 2008/0292188 A1 | 11/2008 | Ettan et al. | |
| 2009/0141940 A1 | 6/2009 | Zhao et al. | |
| 2010/0057694 A1 | 3/2010 | Kunjithapatham et al. | |
| 2010/0070483 A1 | 3/2010 | Delgo et al. | |
| 2010/0070523 A1 | 3/2010 | Delgo et al. | |
| 2010/0082585 A1 | 4/2010 | Barsook et al. | |
| 2010/0104261 A1 | 4/2010 | Liu et al. | |
| 2010/0205203 A1 | 8/2010 | Anderson et al. | |
| 2012/0008821 A1 | 1/2012 | Sharon et al. | |

FOREIGN PATENT DOCUMENTS

| | | |
|---|---|---|
| EP | 1732329 | 12/2006 |
| JP | 6105211 | 4/1994 |

OTHER PUBLICATIONS

Delgo et al., U.S Office Action mailed on Aug. 27, 2009, directed to U.S. Appl. No. 11/687,326; 58 pages.

Delgo et al., U.S Office Action mailed on Aug. 27, 2009 directed at U.S. Appl. No. 11/687,300; 56 pages.

International Search Report and Written Opinion mailed on Aug. 24, 2009 directed at application No. PCT/US2009/50409; 11 pages.

Polimeni, J. et. al., "Space-time Adaptive Image Representations: Data Structures, Hardware and Algorithms," in Defining a Motion Imagery Research and Development Program workshop,Virginia's Center for Innovative Technology: published Nov. 20, 2001, located at <http://eslab.bu.edu/publications/proceedings/2001/polimeni2001space-time.pdf> visited on Aug. 13, 2009. 23 pages.

International Preliminary Report on Patentability and Written Opinion dated Jun. 4, 2009 directed at related application No. PCT/US2007/024198; 5 pages.

International Search Report mailed on Sep. 22, 2008 directed at counterpart application No. PCT/US2008/64683;1 page.

Delgo et al., U.S Office Action mailed on Dec. 29, 2008 directed at U.S. Appl. No. 11/687,300; 52 pages.

Delgo et al., U.S Office Action mailed on Dec. 29, 2008 directed at U.S. Appl. No. 11/687,326; 54 pages.

Delgo et al., U.S Office Action mailed on Dec. 22, 2008 directed at U.S. Appl. No. 11/687,290; 52 pages.

Delgo et al., U.S Office Action mailed on Jul. 8, 2009 directed at U.S. Appl. No. 11/687,290; 57 pages.

International Search Report and Written Opinion issued for PCT/US2007/024197; Dated: May 19, 2008; 10 Pages.

Lowe, "Object recognition from local scale-invariant features". (1999).

Mikolajczyk et al., "A performance evaluation of local descriptors". (2005).

Ng et al., "On Spectral Clustering: Analysis and an algorithm," 2001. http://citeseerx.ist.psu.edu/viewdoc/summary?doi=10.1.1.19.8100.

Okuma et al., A boosted particle filter: Multi-target detection and tracking, ECCV, 2004. http://www.springerlink.com/content/wyf1nw3xw53xjnf3/.

Rabiner "A tutorial on Hidden Markov Models and selected applications in speech recognition". (Feb. 1989).

Viola et al., "Rapid object detection using a boosted cascacd of simple features," Proc. Computer Vision and Pattern Recognition, 2001.

Sharon et al., U.S. Office Action mailed Aug. 26, 2010, directed to U.S. Appl. No. 11/687,341; 28 pages.

Aji, et al. (2000). "The Generalized Distributive Law", *IEEE Transactions on Information Theory* 46(2):325-343.

Bhattacharyya. (1943)."On a measure of divergence between two statistical populations defined by their probability distributions", *Bulletin of the Calcutta Mathematical Society* 35: 99-109. MR0010358.

Sharon et al., U.S. Office Action mailed Jul. 9, 2010, directed to related U.S. Appl. No. 11/802,498; 8 pages.

Office Action dated Jul. 19, 2012, in U.S. Appl. No. 11/687,341, filed Mar. 16, 2007.

Amendment dated May 30, 2012, in U.S. Appl. No. 11/687,341, filed Mar. 16, 2007.

Amendment dated Feb. 28, 2011, in U.S. Appl. No. 11/687,341, filed Mar. 16, 2007.

Notice of Allowance dated Jul. 11, 2012, in U.S. Appl. No. 12/502,202, filed Jul. 13, 2009.

Amendment dated May 23, 2012, in U.S. Appl. No. 12/502,202, filed Jul. 13, 2009.

Office Action dated Nov. 23, 2011, in U.S. Appl. No. 12/502,202, filed Jul. 13, 2009.

Amendment dated Sep. 23, 2011, in U.S. Appl. No. 12/502,202, filed Jul. 13, 2009.

Notice of Allowance dated Aug. 17, 2012, in U.S. Appl. No. 12/502,206, filed Jul. 13, 2009.

Amendment dated May 21, 2012, in U.S. Appl. No. 12/502,206, filed Jul. 13, 2009.

Office Action dated Nov. 21, 2012, in U.S. Appl. No. 12/502,206, filed Jul. 13, 2009.

Amendment dated Sep. 29, 2011, in U.S. Appl. No. 12/502,206, filed Jul. 13, 2009.

Sharon et al., U.S. Office Action mailed Mar. 23, 2011, directed to U.S. Appl. No. 11/687,341; 14 pages.

Sharon et al., U.S. Office Action mailed Mar. 8, 2011, directed to U.S. Appl. No. 11/984,670; 6 pages.

Delgo et al., U.S. Office Action mailed Mar. 23, 2011, directed to U.S. Appl. No. 12/502,202; 42 pages.

Delgo et al., U.S. Office Action mailed Mar. 29, 2011, directed to U.S. Appl. No. 12/502,206; 17 pages.

Borenstein et al., "Combining Top-Down and Bottom-Up Segmentation", 2004 Conference on Computer Vision and Pattern Recognition Workshop, 27-02 Jun. 27-2, 2004, 1-8.

Borenstein et al., "Combining Top-Down and Bottom-Up Segmentation", Proceedings IEEE workshop on Perceptual Organization in Computer Vision, IEEE Conference on Computer Vision and Pattern Recognition, Washington, DC, Jun. 2004.

Bourke, Intersection Point of Two Lnes (2 Dimensions), http://local.wasp.uwa.edu.au/~pbourke/geometry/lineline2d/, (Apr. 1989), 1-2.

Brandt et al., "Fast Calculation of Multiple Line Integrals"; SIAM J. Sci. Comput., 1999, 1417-1429, vol. 20(4).

Cai et al., "Mining Association Rules with Weighted Items", Database Engineering and Applications Symposium, 1998. Proceedings. IDEAS'98. International, Jul. 8-10, 1998, 68-77.

Corso et al., "Multilevel Segmentation and Integrated Bayesian Model Classification with an Application to Brain Tumor Segmentation", Medical Image Computing and Computer-Assisted Intervention (MICCAI), 2006, Appeared in Springer's "Lecture Notes in Computer Science".

Galun et al., "Texture Segmentation by Multiscale Aggregation of Filter Responses and Shape Elements", Proceedings IEEE International Conference on Computer Vision, 716-723, Nice, France, 2003.

Gorelick et al., "Shape Representation and Classification Using the Poisson Equation", IEEE Transactions on Pattern Analysis and Machine Intelligence, Dec. 2006, 1991-2005, vol. 28(12).

Gorelick et al., "Shape Representation and Classification Using the Poisson Equation", Proceedings IEEE Conference on Computer Vision and Pattern Recognition, Washington, DC, Jun. 2004.

Lee et al., "A Motion Adapative De-interfacing Method Using an Efficient Spatial and Temporal Interpolation", IEEE Transactions on Consumer Electronics, 2003, 1266-1271, vol. 49(4).

Lindley, "Creation of an MPEG-7 Feature Extraction Plugin for the platform METIS", Universität Wien/TU Wien, 2006, Betreuer: R. King, W. Klas.

Lucas et al., "An Iterative Image Registration Technique with an Application to Stereo Vision", Proceedings of Imaging Understanding Workshop, 1981, 121-129.

Sharon et al., "Completion Energies and Scale", IEEE Transactions on Pattern Analysis and Machine Intelligence, 2000, 1117-1131, vol. 22(10).

Sharon et al., "Fast Multiscale Image Segmentation" Proceedings IEEE Conference on Computer Vision and Pattern Recognition, I:70-77, South Carolina, 2000.

Sharon et al., "2D-Shape Analysis using Conformal Mapping", International Journal of Computer Vision, Oct. 2006, 55-75, vol. 70(1).

Sharon et al., "2D-Shape Analysis using Conformal Mapping", Proceedings IEEE Conference on Computer Vision and Pattern Recognition, Washington, DC, 2004, 1-8.

Sharon et al., "Completion Energies and Scale", Proceedings IEEE Conference on Computer Vision and Pattern Recognition, 1997, 884-890, Puerto Rico.

Sharon et al., "Hierarchy and Adaptivity in Segmenting Visual Scenes", Nature, 2006, Jun. 28th online; Aug. 17th print, 1-4.

Sharon et al., "Segmentation and Boundary Detection Using Multiscale Intensity Measurements", Proceedings IEEE Conference on Computer Vision and Pattern Recognition, I:469-476, Kauai, Hawaii, 2001.

Shi et al., "Good Features to Track," 1994 IEEE Conference on Computer Vision and Pattern Recognition (CVPR'94), 1994, 593-600.

Tao et al., "Weighted Association Rule Mining using Weighted Support and Significance Framework", In: The Ninth ACM SIGKDD International Conference on Knowledge Discovery and Data Mining (ACM SIGKDD 2003), Aug. 24-27, 2003, Washington DC, USA.

* cited by examiner

METHOD OF PERFORMING MOTION-BASED OBJECT EXTRACTION AND TRACKING IN VIDEO

CROSS REFERENCE TO RELATED APPLICATIONS

This application claims priority under 35 U.S.C. §119(e) of U.S. Provisional Application Nos. 60/869,271 and 60/869,279 filed Dec. 8, 2006 and 60/866,552 filed Nov. 20, 2006 and is related to U.S. patent application Ser. Nos. 11/687,341 entitled Computer Program and Apparatus for Motion-Based Object Extraction and Tacking in Video by the inventors of the present application; and 11/687,290 entitled Apparatus for Performing a Weight-Based Search; 11/687,300 entitled Method of Performing a Weight-Based Search; 11/687,326 entitled Computer Program Implementing a Weight-Based Search by Lior Delgo et al. all of which non-provisional applications were filed on Mar. 16, 2007 contemporaneously herewith, all of the previously cited provisional and non-provisional applications being incorporated herein by reference in their entireties.

FIELD OF THE INVENTION

The invention relates to processing of video to identify salient objects and, in particular, using motion-based analysis to extract and track salient objects in time-space.

BACKGROUND OF THE INVENTION

Videos are composed of series of still images, each representing photometric qualities. To be useful in many applications, there is a need for automated correlation between these photometric features and physically cognizable objects, e.g., people, scenery, etc. Identification of physical objects may be accomplished by object extraction. With the proliferation of videos (e.g., on the Internet), there is an increasing need for efficient methods and apparatus for extracting objects to support object-based tagging and searching of videos.

SUMMARY OF THE INVENTION

The invention is directed toward a method of performing object extraction from video content and use of such methods and systems to generate indexed video. According to one aspect of the invention, a method of extracting objects from a video comprising steps of identifying regions to be tracked, tracking the regions across several frames, calculating motions of the regions, and identifying new regions to be tracked. Although recited in a particular sequence, the steps and substeps are capable of rearrangement within the scope of the invention. Thus, according to one implementation, regions of a selected frame of the video that are appropriate for tracking are selected. Tracking of the identified regions is performed across frames subsequent to the selected frame of the video. Motions of the identified regions are calculated, and new regions for tracking are identified. Note that the term "video" is used herein in its broadest sense to include an electronically stored sequence of still images that represent scenes in motion and "video content" means image information stored in the form of a video.

According to an aspect of the invention, the step of identifying new regions for tracking may be responsive to the steps of calculating motions of the identified regions and/or tracking identified regions across frames. According to another aspect of the invention, the step of identifying regions of the selected frame may include steps of segmenting at least one frame of the video to partition the frame into coherent regions and/or extracting local motion estimations for various points in the selected frame across the frames subsequent to the selected frame.

According to another aspect of the invention, the step of tracking identified regions across the frames subsequent to the selected frame may include a step of determining a motion of each of the identified regions of the selected frame across the frames subsequent to the selected frame.

According to another aspect of the invention, the step of determining a motion of each of the identified regions may include (i) fitting the identified regions to the frames subsequent to the selected frame and/or (ii) estimating local motion within the selected frame.

According to another aspect of the invention, the step of tracking identified regions across the frames subsequent to the selected frame may include a step of (i) determining whether a moveable object is trackable and/or (ii) determining whether one of the frames subsequent to the selected frame is substantially different from the selected frame.

According to other aspects of the invention, the step of calculating motions of the identified regions may include a step of (i) determining a motion of each of the identified regions of the selected frame across the frames subsequent to the selected frame, (ii) grouping together ones of the identified regions based on their common motion to generate more complex regions of interest, (iii) determining a camera motion and factoring the camera motion out to identify salient objects that move differently from the camera motion, (iv) identifying a salient object and continuing tracking of the salient object, and/or (iv) receiving user input designating a salient object of interest.

According to another aspect of the invention, a method of generating an indexed video includes identifying regions of a frame of the video appropriate for tracking, tracking identified regions across subsequent frames of the video, calculating motions of the identified regions including identifying coherent video objects, identifying new regions for tracking in response to the calculated motions, creating tubes that relate to the coherent video objects, and indexing and storing the tubes in a searchable database.

According to another aspect of the invention, the step of tracking may include generating tracking information and the step of creating tubes includes a step of collecting the tracking information into space-time threads.

According to another aspect of the invention, the step of creating tubes may include steps of identifying common salient objects and joining ones of the tubes of respective ones of the common salient objects.

According to another aspect of the invention, steps of analyzing tube features to identify the weights, tagging and assigning weights to each of the tubes may further be included.

An apparatus for extracting objects from a video may include a local tracking engine configured to identify regions of a selected frame of the video appropriate for tracking. The local tracking engine may include a motion calculation engine. An interframe tracking engine receives the identified regions from the local tracking engine and identifies regions across frames subsequent to the selected frame of the video. The motion calculation engine calculates motions of the identified regions.

An apparatus for generating an indexed video may include a frame segmentation engine configured to identify regions of a frame of the video appropriate for tracking; a tracking engine configured receiving and tracking the identified regions across subsequent frames of the video; a motion calculation engine configured to calculate motions of the identified regions and identify coherent video objects; an object recognition engine configured to create tubes that relate to the coherent video objects; and a searchable database configured to index and store the tubes.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

DETAILED DESCRIPTION OF A PREFERRED EMBODIMENT OF THE INVENTION

The ensuing description provides exemplary embodiments only, and is not intended to limit the scope, applicability, or configuration of the invention. Rather, the ensuing description of the exemplary embodiments will provide those skilled in the art with an enabling description for implementing an example embodiment of the invention. It should be understood that various changes may be made in the function and arrangement of elements without departing from the spirit and scope of the invention.

Figure 1:
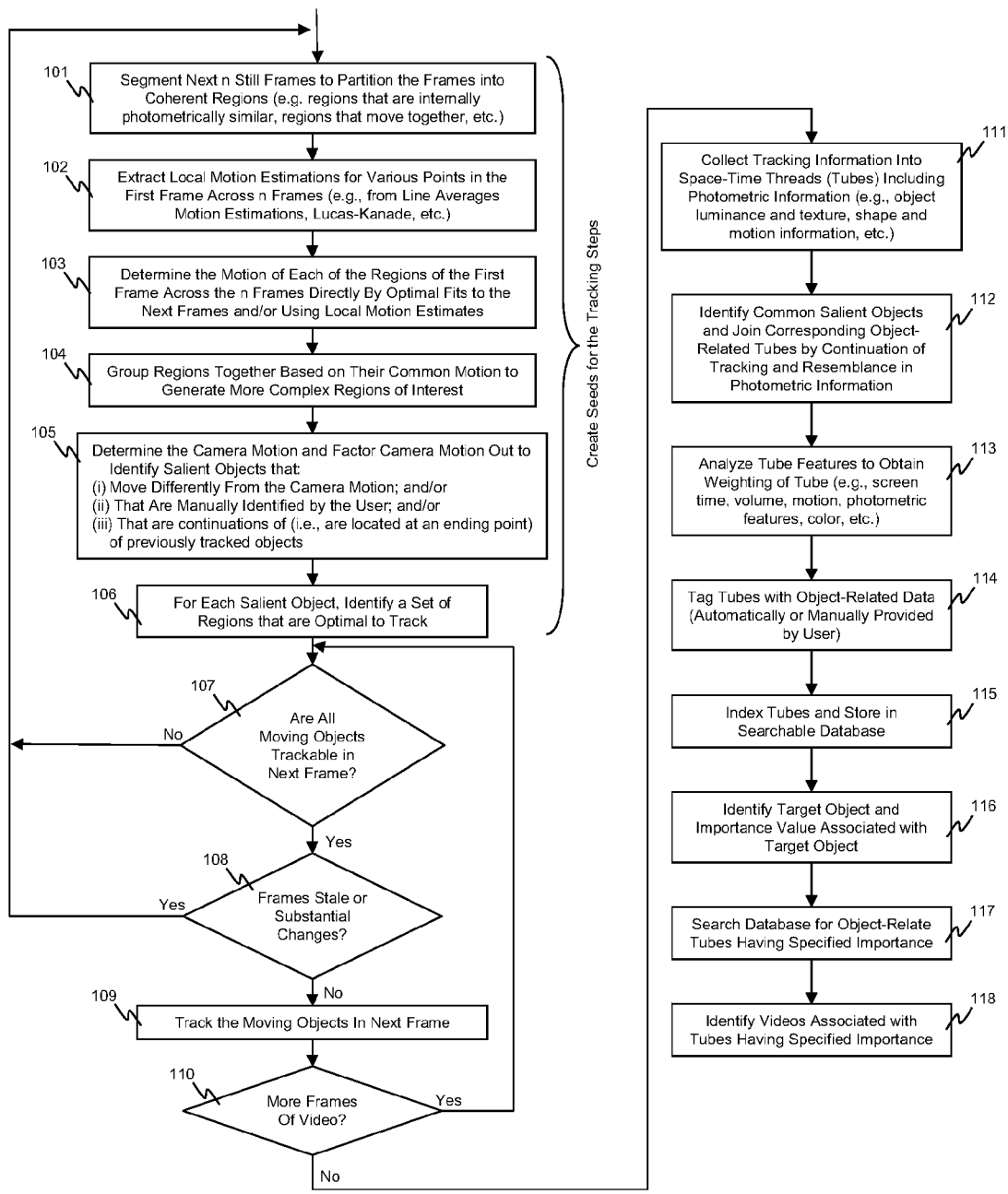
FIG. 1 is a flow diagram of a method according to an embodiment of the invention for extracting objects from a video, generating an indexed video and searching videos based on characteristics of the objects.

Referring to FIG. 1 of the drawings, a method according to an embodiment of the invention extracts objects from a video, generates an indexed video and searches videos based on characteristics of the objects. Initially the method creates seeds, i.e., takes a local view of a small number of frames to identify or create "seeds" in the form of salient objects that will be subject to tracking. Thus, at step 101 the next n (e.g., 2 or 3) frames are segmented so as to partition the frames into coherent regions, that is, regions having a common characteristic. For example, regions may be defined based on internally similar photometric characteristics (e.g., color, luminosity, texture, etc.), motion (regions of picture elements that move in a cohesive manner), etc. At step 102 local motions estimations are extracted for various points of a selected (e.g., first) frame across the n frames (i.e., the selected and some number of subsequent frames). Local motion estimations may be performed by techniques and methods such as, but not limited to, the formation of local line averages motion estimations, Lucas-Kanade, etc. At step 103 a determination is made of the motion of each of the regions defined in step 101 of the selected or first frame across the subsequent (e.g., n) frames. This may be performed by calculating motion between the frames by determining an optimal fit over geometric transformations of each of the regions to the next frame alone or in combination with local motion estimates obtained from step 102.

Using motion information from step 103, at step 104 those regions having common motion (e.g., moving in a cohesive manner or having motion consistent with the motion of some larger or more complex grouping of regions) are grouped together. For example, regions having a motion consistent with being part of a larger object may be grouped together to form more complex regions of interest. At step 105 the method corrects for apparent motion caused by changes of viewing position, e.g., camera motion, rather than by displacement of a region under examination. Thus, any camera motion is identified and "factored out" so that only motion of a region relative to a fixed reference point (e.g., a stationary background) is considered. Step 105 thusly identifies salient objects that move differently from the camera motion. In addition, step 105 provides for identification of salient objects as may be manually designated by a user (e.g., user identification by a mouse click of an interesting visual object that should be tracked) and continuation of tracking of salient objects for which tracking has been lost and/or needs adjustment. In the case of the latter two situations the method may tag the designated salient objects for extra scrutiny and/or special processing in an enhanced attempt to initiate and continue tracking. In the case of a lost or troubled track, step 105 may examine the ending point of an object for which tracking was lost in an attempt to reacquire tracking of the object based on new locally identified regions corresponding to the previously tracked object.

Once regions are grouped into salient objects, it may only be desirable or necessary to track some of the constituent regions rather than all those identified as constituting the object. Thus, at step 106, for each salient object, a set of regions is identified including those regions that are optimal for tracking purposes. Step 107 performs a test to determine if all moving objects in a next frame to be examined are trackable. For example, some regions or even entire objects may disappear from a subsequent frame, an object may be reoriented to a degree that constituent regions being tracked are no longer visible, or any other number and type of events may result in a previously tracked object becoming untrackable. In such cases, processing reverts back to step 101 to initiate creation of new seeds, i.e., local identification over some small set of n frames of trackable regions and their corresponding salient objects. Where reseeding is necessary, prior tracking history may be used to optimize identification of regions to be tracked.

If all moving objects remain trackable in a subsequent frame to be considered, then a second test is applied to determine if it is appropriate to, nonetheless, create new seeds. This may be desirable or necessary so as to identify new regions and/or objects that may have been introduced since tracking was last initiated. It may also be desirable to "reseed" the tracking process if the current frame is "stale", i.e., those regions and objects being tracked no longer represent optimal regions to be tracked in view of, for example, object movement, changes in lighting, interaction between and among objects, etc. If the current selection of regions and/or objects is stale (e.g., too old) or if substantial changes affecting tracking have occurred, then processing again reverts back to step 101. Otherwise, moving objects in the next frame are tracked at step 109. If still further frames of the video remain, then processing loops back to step 107 to continue tracking of the previously identified moving objects.

If all frames have been processed (i.e., the test at step 110 is passed), processing continues at step 111 to collect tracking information into space-time threads or "tubes". The intersection of each tube with a sequence of frames defines areas within each frame containing the selected moving objects previously processed, each tube spanning from the corresponding starting frame for which object tracking began through the ending frame at which tracking was terminated. Associated with each tube is information about the corresponding moving object including that derived from the previously described steps including, by way of example, object luminance and texture, shape, motion information, etc.

At step 112 processing is performed to identify common salient objects and thereby join corresponding object-related tubes. That is, tubes that are found to be associated and/or describe the same object may be joined to create one larger tube in time and/or space. This may be necessary, for example, because tracking of an object may have been lost at some point but reacquired in an immediately subsequent or some later frame (i.e., with no or some intervening frames).

Weighting of each tube is performed at step 113. Weighting may be, for example, a measure of the importance of a moving object. Various indicia of object importance may be considered including, for example, the amount of time or number of frames an object is tracked relative to total video length and/or in comparison to other tracked objects; the volume or space occupied within the frames by an object; amount, speed and nature of motion of the object; photometric features, object color, etc.

Tube (i.e., object) tagging is accomplished at step 114. That is, the corresponding object may be identified by giving it a name or other descriptive designation and/or associated with other information about the tube. Tagging may be accomplished by manual input by the user and/or by automatic recognition of the corresponding object.

At step 115 the tubes and associated object-related data may be indexed and stored in searchable database to complete generation of video indexing.

Steps 116 through 118 represent searching of the database for videos containing targeted objects appearing in the respective videos with a desired importance value. Thus, at step 116 a target object or objects are specified together with their associated importance values. The database is then searched at step 117 for videos having object-related tubes satisfying or most closely satisfying the search conditions, i.e., having (or not having) the target objects and corresponding importance values. The search concludes at step 118 with the identification of videos having or most closely matching the specified criteria.

Although a preferred embodiment of the invention has been described having a specified sequence of steps, other sequences are equally feasible. For example, the motion estimation of special points (e.g., Lucas-Kanade) could precede the segmentation in step 101 of any image and/or the tracking of special points in the image could precede the motion estimation in step 103. While the specified order of steps may be found to be efficient for a particular application and platform, other arrangements of steps may be optimized to other environments. More specifically, the sequence of steps 101 and 102 of FIG. 1 may be exchanged with no further changes being required. In addition, functions performed by some steps may be incorporated into other steps. For example, the functionality of step 101 may be embedded into step 104 given that the determination of motion estimation in step 103 would be replaced by the motion estimations provided by step 102.

Figure 2:
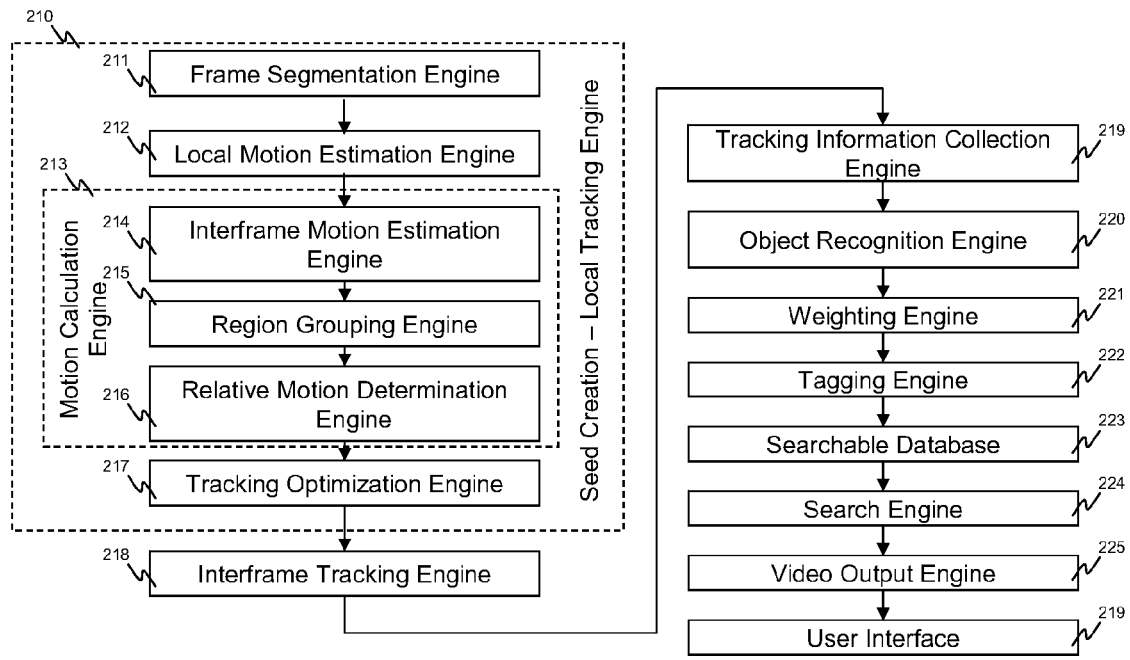
FIG. 2 is an apparatus according to an embodiment of the invention for executing software implementing procedures according to aspects and features of the invention.

FIG. 2 is a block diagram of an apparatus for extracting object from a video to generating an indexed video. Each of the component parts of the apparatus perform functions corresponding to those set forth in connection with the above described method and may be implemented in various forms including, for example, software modules, firmware, hardware and/or any combination thereof. Thus, a local tracking engine 210 includes software, firmware and devices for performing operations corresponding to steps 101-106 with reference to FIG. 1 to creates salient object seeds that will be subject to tracking. Frame segmentation engine 211 segments the next n (e.g., 2 or 3) frames to partition the frames into coherent regions. Local estimation engine 212 extracts motion estimations for various points of a first or later selected initial seed frame across the n frames. Motion estimation may take the form of various implementation including, but not limited to, the formation of local line averages motion estimations, Lucas-Kanade, etc. The result of the local motion estimation is then supplied to interframe motion estimation engine 214 of motion calculation engine 213. Interframe motion estimation engine 213 determines the motion of each of the regions defined by frame segmentation engine 211 for the selected or first frame across some small number of subsequent (e.g., n) frames. Again, this may be performed by calculating motion between the frames by determining an optimal fit over geometric transformations of each of the regions to the next frame alone or in combination with local motion estimates.

Using motion information from interframe motion estimation engine 214, region grouping engine groups those regions having common motion to generate more complex regions of interest. Relative motion determination engine corrects for apparent motion caused by changes of viewing position and identifies salient objects that move differently from the camera motion. Relative motion determination engine 216 may also provide a user interface (e.g., keyboard, mouse, etc.) to allow a user to manually designate and/or salient objects. Still another functionality that may be included is the capability of relative motion determination engine 216 to continue tracking of salient objects for which tracking has been lost and/or needs adjustment either by automatic recognition or manual operator input.

Once regions are grouped into salient objects by motion calculation engine 213, tracking optimization engine 217 identifies a set of regions for each object that is optimal for tracking purposes. However, if one or more of the objects being tracked is no longer trackable or if the frames used to create the seed are too old (e.g., "stale"), then tracking optimization engine initiates generation of a new seed by engines 211-216. Otherwise, moving objects in the next frame are tracked by interframe tracking engine 218.

Upon the tracking of all frames of a video by interframe tracking engine 218, tracking information collection engine 219 collects tracking information into space-time threads or "tubes". Object recognition engine 220 operates to identify common salient objects and thereby join corresponding object-related tubes. Weighing engine 221 assigns a weight to each tube based on one or more indicia of object importance such as the amount of time or number of frames an object is tracked, object size and/or color in the frame, etc. Tagging engine 222 tags the tube that is then indexed and stored in searchable database 223 to complete generation of video indexing.

Search engine 224 accepts a user or otherwise designated target object with corresponding importance value and searches searchable database 223 to identify videos containing the targeted objects with the desired importance value.

Thus, at step 116 a target object or objects are specified together with their associated importance values. In response to user selection of one or more of the identified videos, the selected video(s) may be retrieved by video output engine 225 and provided to the user by user interface 219 (e.g., a personal computer.) As before, the present embodiment has been described by way of example including one arrangement of components and sequence of processing. However, other arrangements and sequences are equally feasible. For example, local motion estimation engine 212 might be arranged prior to frame segmentation engine 211 with no further changes being required. In addition, functions performed by some engines may be incorporated into others. For example, the functionality performed by frame segmentation engine 211 might be embedded into region grouping engine 215 given that the determination of motion estimation performed by interframe motion estimation engine 214 might be replaced by the motion estimations provided by local motion estimation engine 212.

Figure 3:
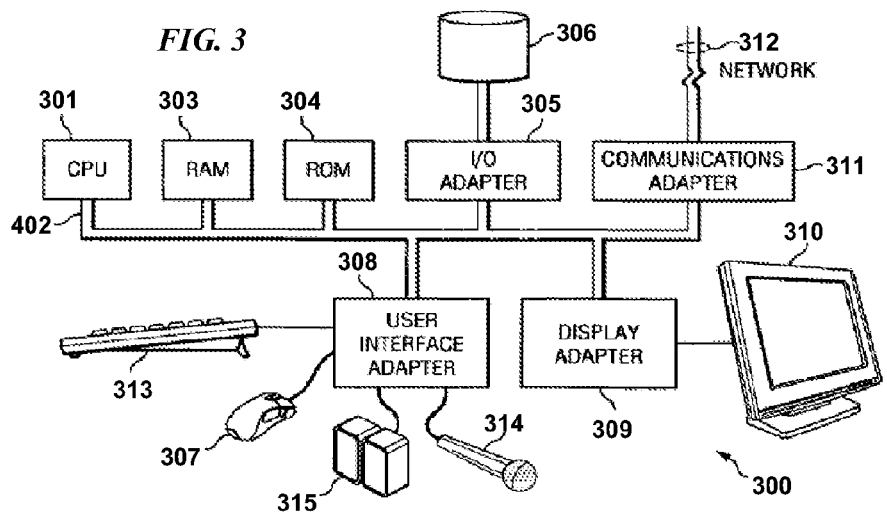
FIG. 3 is a block diagram of an exemplary computer system for executing a program set of instruction for performing object extraction and/or video indexing.

FIG. 3 illustrates an exemplary computer system 300 on which object extraction from video content and the generation of indexed video may be implemented according to one embodiment of the present invention. Central processing unit (CPU) 301 is coupled to system bus 302. CPU 301 may be any general purpose CPU. The present invention is not restricted by the architecture of CPU 301 (or other components of exemplary system 300) as long as CPU 301 (and other components of system 300) supports the inventive operations as described herein. CPU 301 may execute the various logical instructions according to embodiments of the present invention. For example, CPU 301 may execute machine-level instructions according to the exemplary operational flows described above in conjunction with FIGS. 1 and 2.

Computer system 300 also preferably includes random access memory (RAM) 303, which may be SRAM, DRAM, SDRAM, or the like. Computer system 300 preferably includes read-only memory (ROM) 304 which may be PROM, EPROM, EEPROM, or the like. RAM 303 and ROM 304 hold/store user and system data and programs, such as a machine-readable and/or executable program of instructions for object extraction and/or video indexing according to embodiments of the present invention.

Computer system 300 also preferably includes input/output (I/O) adapter 305, communications adapter 311, user interface adapter 308, and display adapter 309. I/O adapter 305, user interface adapter 308, and/or communications adapter 311 may, in certain embodiments, enable a user to interact with computer system 300 in order to input information.

I/O adapter 305 preferably connects to storage device(s) 306, such as one or more of hard drive, compact disc (CD) drive, floppy disk drive, tape drive, etc. to computer system 300. The storage devices may be utilized when RAM 303 is insufficient for the memory requirements associated with storing data for operations of the system (e.g., storage of videos and related information). Although RAM 303, ROM 304 and/or storage device(s) 306 may include media suitable for storing a program of instructions for object extraction and/or video indexing according to embodiments of the present invention, those having removable media may also be used to load the program and/or bulk data such as large video files.

Communications adapter 311 is preferably adapted to couple computer system 300 to network 312, which may enable information to be input to and/or output from system 300 via such network 312 (e.g., the Internet or other wide-area network, a local-area network, a public or private switched telephony network, a wireless network, any combination of the foregoing). For instance, users identifying or otherwise supplying a video for processing may remotely input access information or video files to system 300 via network 312 from a remote computer. User interface adapter 308 couples user input devices, such as keyboard 313, pointing device 307, and microphone 314 and/or output devices, such as speaker(s) 315 to computer system 300. Display adapter 309 is driven by CPU 301 to control the display on display device 310 to, for example, display information regarding a video being processed and providing for interaction of a local user or system operator during object extraction and/or video indexing operations.

It shall be appreciated that the present invention is not limited to the architecture of system 300. For example, any suitable processor-based device may be utilized for implementing object extraction and video indexing, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

It should also be noted and understood that all publications, patents and patent applications mentioned in this specification are indicative of the level of skill in the art to which the invention pertains. All publications, patents and patent applications are herein incorporated by reference to the same extent as if each individual publication, patent or patent application was specifically and individually indicated to be incorporated by reference in its entirety.

The invention claimed is:

1. A computer-implemented method of extracting objects from a video comprising the steps of:
   identifying, by a processor, regions of a selected frame of the video appropriate for tracking movement of one or more salient objects appearing in the video;
   tracking, by a processor, identified regions across frames subsequent to said selected frame of the video;
   calculating, by a processor, motions of the identified regions including reacquiring tracking of a previously identified salient object for which tracking had been lost;
   identifying, by a processor, new regions for tracking, said identifying based on determining whether one or more previously tracked salient objects have become untrackable, changes in the movement of the salient objects, new salient objects and changes in interactions between the salient objects;
   collecting, by a processor, tracking information related to the movement of the salient objects into one or more object-related tubes;
   assigning a weight, by a processor, to each object-related tube, wherein the weight is determined based on the amount of time or the number of frames by which the salient objects are tracked relative to the total video length in comparison to one or more other tracked objects;

receiving, by a processor, search criteria specifying a target object and a corresponding weight associated with the target object;

searching, by a processor, one or more videos having object-related tubes that match the target object and the corresponding weight associated with the target object; and displaying, by a processor, the one or more videos to a user.

2. The method according to claim 1 wherein said step of identifying new regions for tracking is responsive to said step of calculating motions of said identified regions.

3. The method according to claim 1 wherein said step of identifying new regions for tracking is responsive to said step of tracking identified regions across frames.

4. The method according to claim 1 wherein said step of identifying regions of said selected frame includes a step of segmenting at least one frame of the video to partition the at least one frame into coherent regions.

5. The method according to claim 1 wherein said step of identifying regions of said selected frame includes a step of extracting local motion estimations for various points in the selected frame across said frames subsequent to said selected frame.

6. The method according to claim 1 wherein said step of tracking identified regions across said frames subsequent to said selected frame includes a step of determining whether a moveable object is trackable.

7. The method according to claim 1 wherein said step of tracking identified regions across said frames subsequent to said selected frame includes a step of determining whether one of said frames subsequent to said selected frame is substantially different from said selected frame.

8. The method according to claim 1 wherein said step of calculating motions of the identified regions includes a step of determining a motion of each of the identified regions of the selected frame across said frames subsequent to said selected frame.

9. The method according to claim 1 wherein said step of calculating motions of the identified regions includes a step of grouping together ones of said identified regions based on their common motion to generate more complex regions of interest.

10. The method according to claim 1 wherein said step of calculating motions of the identified regions includes steps of determining a camera motion and factoring said camera motion out to identify salient objects that move differently from said camera motion.

11. The method according to claim 1 wherein said step of calculating motions of the identified regions includes steps of identifying a salient object and continuing tracking of said salient object.

12. The method according to claim 1 wherein said step of calculating motions of the identified regions includes a step of receiving user input designating a salient object of interest.

13. The method according to claim 1 wherein said step of tracking identified regions across said frames subsequent to said selected frame includes a step of determining a motion of each of the identified regions of the selected frame across said frames subsequent to said selected frame.

14. The method according to claim 13 wherein said step of determining a motion of each of the identified regions includes fitting said identified regions to said frames subsequent to said selected frame.

15. The method according to claim 13 wherein said step of determining a motion of each of the identified regions includes a step of estimating local motion within said selected frame.

16. A computer-implemented method of extracting objects from a video comprising the steps of:

identifying, by a processor, regions of a selected frame of the video appropriate for tracking movement of one or more salient objects appearing in the video;

tracking, by a processor, identified regions across frames subsequent to said selected frame of the video;

calculating, by a processor, motions of the identified regions including reacquiring tracking of a previously identified salient object for which tracking had been lost;

identifying, by a processor, new regions for tracking;

assigning a weight, by a processor, to one or more object-related tubes comprising tracking information related to the movement of the salient objects, said weight determined based on the amount of time or the number of frames by which the salient objects are tracked relative to the total video length in comparison to one or more other tracked objects;

searching, by a processor, one or more videos having object-related tubes that match a target object and a corresponding weight associated with the target object, specified by search criteria; and displaying, by a processor, the one or more videos to a user.

17. A computer-implemented method of extracting objects from a video comprising the steps of:

identifying, by a processor, regions of a selected frame of the video appropriate for tracking movement of one or more salient objects appearing in the video;

tracking, by a processor, identified regions across frames subsequent to said selected frame of the video;

calculating, by a processor, motions of the identified regions including reacquiring tracking of a previously identified salient object for which tracking had been lost; and identifying, by a processor, new regions for tracking, said identifying based on determining whether one or more previously tracked salient objects have become untrackable, changes in the movement of the salient objects, new salient objects and changes in interactions between the salient objects.

18. The method of claim 17, further comprising collecting, by a processor, tracking information related to the movement of the salient objects into one or more object-related tubes.

19. The method of claim 18, wherein the step of collecting comprises assigning a weight, by a processor, to each object-related tube, wherein the weight is determined based on the amount of time or the number of frames by which the salient objects are tracked relative to the total video length in comparison to one or more other tracked objects.

20. The method of claim 19, further comprising searching, by a processor, one or more videos having object-related tubes that match a target object and a corresponding weight associated with the target object, specified by search criteria.

* * * * *